(12) United States Patent
Takahashi

(10) Patent No.: US 10,006,779 B2
(45) Date of Patent: Jun. 26, 2018

(54) TRANSMISSION NECESSITY DETERMINATION APPARATUS AND ROUTE PLANNING SYSTEM

(71) Applicant: Toyota Jidosha Kabushiki Kaisha, Toyota-shi, Aichi-ken (JP)

(72) Inventor: Norihiro Takahashi, Shizuoka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/665,878

(22) Filed: Aug. 1, 2017

(65) Prior Publication Data

US 2018/0038709 A1   Feb. 8, 2018

(30) Foreign Application Priority Data

Aug. 8, 2016  (JP) ................................ 2016-155606

(51) Int. Cl.
*G01C 21/36* (2006.01)
*G01C 21/34* (2006.01)
(Continued)

(52) U.S. Cl.
CPC ..... *G01C 21/3658* (2013.01); *G01C 21/3492* (2013.01); *G08G 1/0112* (2013.01); *G08G 1/09626* (2013.01); *G08G 1/096827* (2013.01)

(58) Field of Classification Search
CPC ............ G01C 21/3658; G01C 21/3492; G08G 1/096827; G08G 1/09626; G08G 1/0112
(Continued)

(56) References Cited

U.S. PATENT DOCUMENTS 6,154,152 A    11/2000  Ito
6,401,029 B1 *  6/2002  Kubota ............. G01C 21/3611
                                                                 701/408
(Continued)

FOREIGN PATENT DOCUMENTS

DE        19847375 A1   5/1999
DE     102005008185 A1   8/2006
(Continued)

OTHER PUBLICATIONS

Road surface condition monitoring via multiple sensor-equipped vehicles; Jinwoo Jang; Andrew W. Smyth; Yong Yang; Dave Cavalcanti; 2015 IEEE Conference on Computer Communications Workshops (INFOCOM WKSHPS) Year: 2015; pp. 43-44.*
(Continued)

*Primary Examiner* — Cuong H Nguyen
(74) *Attorney, Agent, or Firm* — Dinsmore & Shohl LLP

(57) ABSTRACT

A transmission necessity determination apparatus configured to determine whether or not to transmit road-related data acquired by a vehicle-mounted system to a server from a vehicle includes: a stability acquisition unit configured to acquire a stability of the vehicle-mounted system for each position from the vehicle-mounted system; and a transmission necessity determination unit configured to determine whether or not to transmit the road-related data to the server from the vehicle based on at least one of the collection degree of the road-related data for each position on the map and the freshness of the road-related data for each position and the stability of the vehicle-mounted system for each position.

3 Claims, 4 Drawing Sheets

(51) Int. Cl.
*G08G 1/01* (2006.01)
*G08G 1/0962* (2006.01)
*G08G 1/0968* (2006.01)

(58) Field of Classification Search
USPC .................. 701/408–409, 414, 425, 538
See application file for complete search history.

(56) References Cited

U.S. PATENT DOCUMENTS

| | | | | |
|---|---|---|---|---|
| 6,675,081 | B2* | 1/2004 | Shuman | B60K 28/06 340/436 |
| 8,694,240 | B1* | 4/2014 | Lookingbill | G01C 21/00 455/456.1 |
| 9,123,152 | B1 | 9/2015 | Chatham | |
| 2003/0216880 | A1 | 11/2003 | Endoh | |
| 2004/0073361 | A1* | 4/2004 | Tzamaloukas | G01C 21/3691 701/414 |
| 2006/0161340 | A1* | 7/2006 | Lee | G01C 21/26 701/408 |
| 2007/0198177 | A1 | 8/2007 | Yamada | |
| 2014/0172291 | A1* | 6/2014 | Lookingbill | G01C 21/00 701/409 |
| 2015/0185036 | A1* | 7/2015 | Braeuchle | G08G 1/0112 701/538 |

FOREIGN PATENT DOCUMENTS

| | | | | |
|---|---|---|---|---|
| DE | 102007006870 A1 | | 8/2007 | |
| DE | 10 2012 215 | * | 8/2012 | G01C 21/36 |
| JP | 2003-331390 A | | 11/2003 | |
| JP | 2013-152587 A | | 8/2013 | |
| JP | 2014-071632 A | | 4/2014 | |

OTHER PUBLICATIONS

Wireless Networked Omni-directional Video Distribution System Based on Delay Tolerant Network on Disaster Environment Kenta Ito; Kazuka Tsuda; Noriki Uchida; Yoshitaka Shibata; 013 Seventh International Conference on Innovative Mobile and Internet Services in Ubiquitous Computing; Year: 2013; pp. 331-335.*

Prototype model of potholes and road-roughness detection and reporting system; Raziq Yaqub; James Burrell; Xavier Crutcher; Jairus Morrow; 2017 IEEE International Conference on Smart Energy Grid Engineering (SEGE); Year: 2017; pp. 62-66.*

ProbSense.KOM: A Probabilistic Sensing Approach for Gathering Vehicular Sensed Data; Daniel Burgstahler; Tobias Meuser; Ulrich Lampe; Doreen Böehnstedt; Ralf Steinmetz; 2016 IEEE International Conference on Mobile Services (MS); Year: 2016,pp. 9-16.*

A wireless sensor network monitoring system for highway bridges; Amro Al-Radaideh; A. R. Al-Ali; Salwa Bheiry; Sameer Alawnah 2015 International Conference on Electrical and Information Technologies (ICEIT); Year: 2015, pp. 119-124.*

CANOPNR: CAN-OBD programmable-expandable network-enabled reader for real-time tracking of slippery road conditions using vehicular parameters; D. J. Enriquez et al.; 2012 15th International IEEE Conference on Intelligent Transportation Systems Year: 2012; pp. 260-264.*

* cited by examiner

TRANSMISSION NECESSITY DETERMINATION APPARATUS AND ROUTE PLANNING SYSTEM

CROSS-REFERENCE TO RELATED APPLICATION

This application claims priority to Japanese Patent Application No. 2016-155606 filed on Aug. 8, 2016, the entire contents of which are hereby incorporated by reference.

TECHNICAL FIELD

The present disclosure relates to a transmission necessity determination apparatus and a route planning system including the same.

BACKGROUND

In the related art, Japanese Unexamined Patent Publication No. 2013-152587 is known as a technical literature relating to a transmission necessity determination apparatus that determines whether or not to transmit data to a server from a vehicle. In this publication, an information processing system is disclosed, which transmits image data imaged by a vehicle-mounted camera to the server and does not perform the transmission of the image data when another same or similar image data is present in the server.

SUMMARY

Incidentally, in recent years, it is required to collect image data or the like imaged by a vehicle-mounted camera in detail in order to use in update of map information or the like. Due to an improvement of the performance of the vehicle-mounted camera, an amount of data transmitted from the vehicle to a server increases. In this situation, if entire of the collected data is transmitted to the server, pressure on communication lines and burden on communication cost increase. It is desired that unnecessary data is suppressed to be transmitted to the server.

Therefore, in this technical field, it is desirable to provide a transmission necessity determination apparatus that can suppress the transmission of the unnecessary data to the server from the vehicle.

In order to solve the problems described above, a transmission necessity determination apparatus in an aspect of the present disclosure is configured to determine whether or not to transmit road-related data acquired by a vehicle-mounted system to a server from a vehicle. The apparatus includes: a data situation acquisition unit configured to acquire at least one of a collection degree of the road-related data for each position on a map and a freshness of the road-related data for each position; a stability acquisition unit configured to acquire a stability of the vehicle-mounted system for each position from the vehicle-mounted system; and a transmission necessity determination unit configured to determine whether or not to transmit the road-related data to the server from the vehicle based on at least one of the collection degree of the road-related data for each position on the map and the freshness of the road-related data for each position and the stability of the vehicle-mounted system for each position. The transmission necessity determination unit is configured to determine not to transmit the road-related data where the collection degree is equal to or higher than a collection degree threshold value or the road-related data where the freshness is equal to or higher than a freshness threshold value to the server from the vehicle, and to determine not to transmit the road-related data where the stability of the vehicle-mounted system is lower than a stability threshold value to the server from the vehicle.

According the transmission necessity determination apparatus in the aspect of the present disclosure, the road-related data where the collection degree is equal to or higher than the collection degree threshold value or where the freshness is equal to or higher than the freshness threshold value is determined not to be transmitted to the server from the vehicle. In addition, according to the transmission necessity determination apparatus, even if the collection degree is lower than the collection degree threshold value or the freshness is lower than the freshness threshold value, the road-related data where the stability of the vehicle-mounted system is lower than the stability threshold value is determined not to be transmitted to the server from the vehicle. Therefore, it is possible to prevent the road-related data having the low stability of the vehicle-mounted system and the low reliability from being transmitted to the server from the vehicle. Therefore, according to the transmission necessity determination apparatus, it is possible to suppress the transmission of unnecessary road-related data to the server from the vehicle.

In another aspect of the present disclosure, a route planning system is configured to include the transmission necessity determination apparatus described above and configured to be mounted on a vehicle. The system includes: a road-related data acquisition unit configured to acquire road-related data of a travelling road on which the vehicle travels; a vehicle position recognition unit configured to recognize a position of the vehicle on a map; and a route plan generation unit configured to generate a route plan for the vehicle based on: at least one of a collection degree of the road-related data for each position on the map acquired by the transmission necessity determination apparatus and a freshness of the road-related data for each position acquired by the transmission necessity determination apparatus; the position of the vehicle on the map; and map information. The route plan generation unit is configured to generate the route plan such that a collection target position is included in the route for the vehicle, which is a position where the collection degree of the road-related data is lower than a first threshold value or a position where the freshness of the road-related data is lower than a second threshold value.

Since the route planning system in another aspect of the present disclosure includes the transmission necessity determination apparatus described above, it is possible to suppress the transmission of the unnecessary road-related data to the server from the vehicle. In addition, according to the route planning system, the route plan is generated such that the collection target position is included in the route for the vehicle, which is the position where the collection degree of the road-related data is lower than the first threshold value or a position where the freshness of the road-related data is lower than the second threshold value, and thus, it is possible to efficiently collect the road-related data required for the generation of the map information or the like.

The route planning system in another aspect of the present disclosure may generate a route plan including a lane change of the vehicle such that the vehicle travels through the collection target position in the adjacent lane in a case where the collection target position is present in the vehicle travelling direction in an adjacent lane adjacent to a travelling lane in which the vehicle travels and the position in the travelling lane adjacent to the collection target position in the adjacent lane is not the collection target position. According to the route planning system, in a case where the collection target position is present in the vehicle travelling direction in the adjacent lane adjacent to the travelling lane and the position in the travelling lane adjacent to the collection target position in the adjacent lane is not the collection target position, the route plan including the lane change of the vehicle is generated such that the vehicle travels through the collection target position in the adjacent lane. Therefore, it is possible to efficiently collect the road-related data in a lane by lane basis.

As described above, according to the transmission necessity determination apparatus in an aspect of the present disclosure and the route planning system in another aspect of the present disclosure, it is possible to suppress the transmission of the unnecessary road-related data to the server from the vehicle.

DETAILED DESCRIPTION

Hereinafter, an embodiment of the present disclosure will be described with reference to the drawings.

Figure 1:
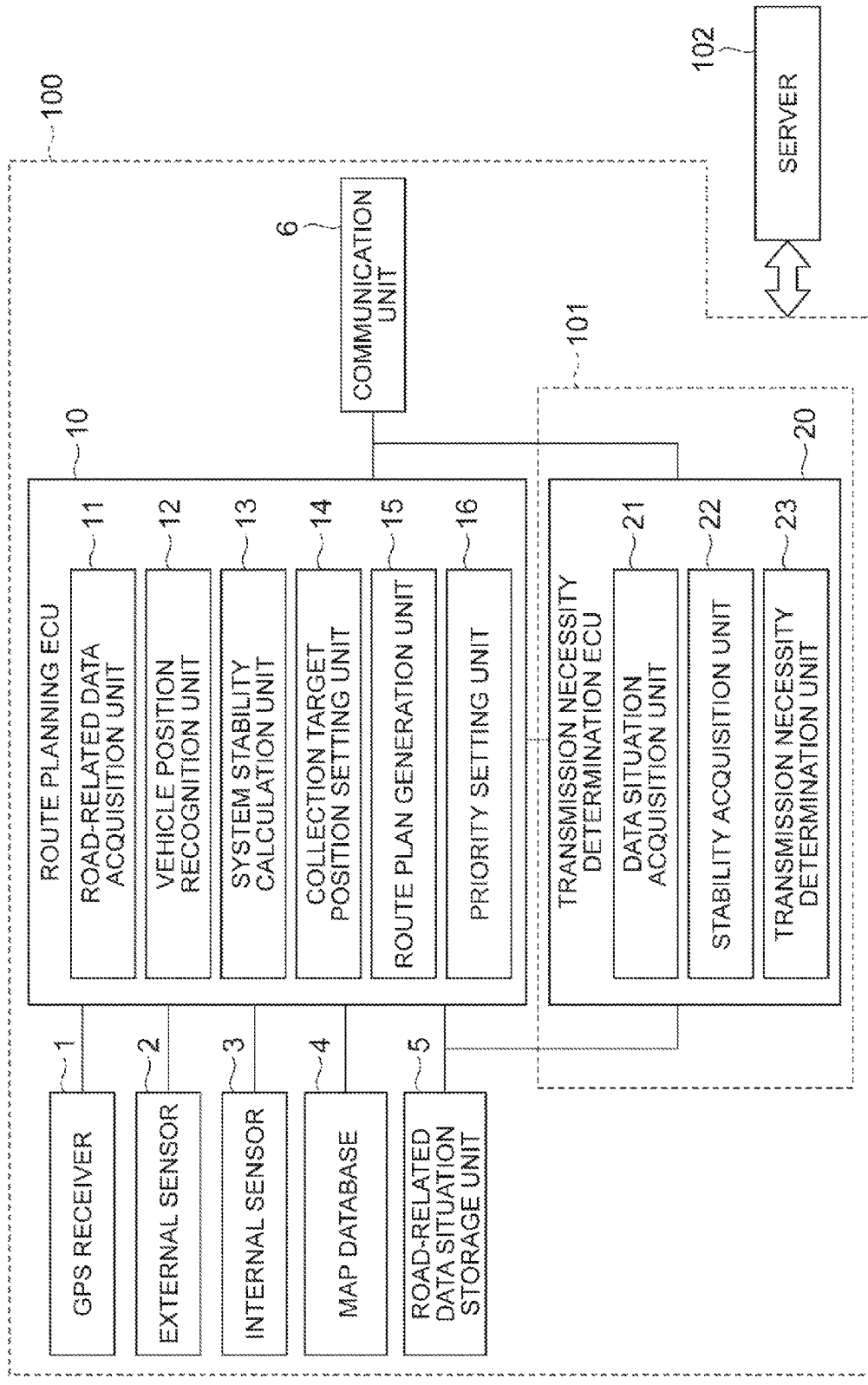
FIG. 1 is a block diagram illustrating a route planning system in the present embodiment.

A route planning system 100 in the present embodiment illustrated in FIG. 1 is a vehicle-mounted system that is mounted on a vehicle and generates a route plan for the vehicle to travel. The route planning system 100 may be configured as a part of an autonomous driving system that performs autonomous driving of the vehicle. In this case, the route planning system 100 generates a route plan relating to a route on which the autonomously driving vehicle travels.

The route planning system 100 includes a transmission necessity determination apparatus 101 that determines whether or not to transmit road-related data collected by the vehicle to a server 102. The road-related data and the transmission necessity determination apparatus 101 will be described below.

The server 102 is a server provided in a facility such as a management center that manages traffic information. The server 102 is configured as a typical computer that includes a CPU, a storage unit, and a network communication device. The server 102 determines the necessity of updating map information based on the road-related data transmitted from the vehicle. For example, in a case where it is determined that the updating of the map information is necessary, the server 102 updates content of the map information using the stored road-related data. The server 102 may be a cloud server.

Configuration of Route Planning System

As illustrated in FIG. 1, the route planning system 100 in the present embodiment includes a route planning electronic control unit (ECU) 10. The route planning ECU 10 is an electronic control unit that includes a central processing unit (CPU), a read only memory (ROM), a random access memory (RAM), a controller area network (CAN), a communication circuit, and the like. For example, the route planning ECU 10 realizes various functions by loading a program stored in the ROM on the RAM, and executing the program loaded on the RAM using the CPU. The route planning ECU 10 may be configured to include a plurality of electronic control units.

The route planning ECU 10 is connected to a GPS receiver 1, an external sensor 2, an internal sensor 3, a map database 4, a road-related data situation storage unit 5, and a communication unit 6.

The GPS receiver 1 receives signals from three or more GPS satellites and measures the position of the vehicle (for example, the latitude and longitude of the vehicle). The GPS receiver 1 transmits the measured position information of the vehicle to the route planning ECU 10.

The external sensor 2 is a detection device that detects a situation around the vehicle. The external sensor 2 includes a camera and a radar sensor.

The camera is an imaging device that images external situations of the vehicle. The camera is provided on the inside of windshield of the vehicle. The camera transmits image information relating to the external situations of the vehicle to the route planning ECU 10. The camera may be a monocular camera or may be a stereo camera. The stereo camera has two imaging units that are arranged so as to reproduce a binocular parallax. The image information from the stereo camera includes information in the depth direction.

The radar sensor detects an obstacle around the vehicle using a radio wave (for example, a millimeter wave) or light. The radar sensor detects the obstacle by transmitting the radio wave or light to the surroundings of the vehicle and receiving the wave or light reflected from the obstacle. The radar sensor is, for example, millimeter wave radar or may be a LIDAR. The radar sensor transmits the detected obstacle information to the route planning ECU 10. The obstacles include fixed obstacles such as guardrails and buildings, and moving obstacles such as pedestrians, bicycles, and other vehicles. The external sensor 2 may include only any one of the camera and the radar sensor.

The internal sensor 3 is a detection device that detects a travelling state of a vehicle. The internal sensor 3 includes a vehicle speed sensor, an acceleration sensor, and a yaw rate sensor. The vehicle speed sensor is a detection device that detects a speed of the vehicle. As the vehicle speed sensor, for example, a wheel speed sensor is used, which is provided on vehicle wheels of the vehicle or a drive shaft rotating integrally with vehicle wheels, and detects a rotational speed of the vehicle wheels. The vehicle speed sensor transmits the detected vehicle speed information (wheel speed information) to the route planning ECU 10.

The acceleration sensor is a detection device that detects an acceleration of the vehicle. The acceleration sensor includes, for example, a longitudinal acceleration sensor that detects acceleration in a longitudinal direction of the vehicle and a lateral acceleration sensor that detects an acceleration in a lateral direction of the vehicle. The acceleration sensor transmits, for example, acceleration information of the vehicle to the route planning ECU 10. The yaw rate sensor is a detection device that detects a yaw rate around a vertical axis of the center of gravity of the vehicle (rotational angular velocity). As the yaw rate sensor, for example, a gyro sensor can be used. The yaw rate sensor transmits the detected yaw rate information of the vehicle to the route planning ECU 10.

The map database 4 is a database in which map information is stored. The map database 4 is formed, for example, in a hard disk drive (HDD) mounted on the vehicle. In the map information, position information of roads, information of road types (for example, types of roads such as straight roads, curved roads, and a curve radius), position information of intersections and branch points, and position information of buildings are included. The map database 4 may be stored in a computer in a facility such as a management center which is capable of communicating with the vehicle.

The road-related data situation storage unit 5 is a database in which a road-related data situation accumulated in the server 102 are stored. The road-related data situation storage unit 5 stores the road-related data situation in association with the position on the map. The road-related data situation will be described below. The road-related data situation storage unit 5 performs updating of the database by periodical communication with the server 102, and stores the road-related data situation acquired from the server 102.

The communication unit 6 is a device that performs communication with the server 102 outside of the vehicle. The communication unit 6 may perform vehicle-to-vehicle communication with another vehicle. The communication unit 6 transmits the acquired communication information to the route planning ECU 10.

Next, a functional configuration of the route planning ECU 10 will be described. The route planning ECU 10 includes a road-related data acquisition unit 11, a vehicle position recognition unit 12, a system stability calculation unit 13, a collection target position setting unit 14, a route plan generation unit 15, and a priority setting unit 16.

The road-related data acquisition unit 11 acquires road-related data. The road-related data means data relating to a road collected by the vehicle. In the road-related data, image information of the road imaged by the camera on the vehicle and lane line information of the road detected by the radar sensor on the vehicle and the like are included. The image information may be compressed image information or may be image information converted into an overhead view image.

In addition, in the road-related data, information items on guardrails, walls, electric poles along the road detected by the radar sensor on the vehicle may be included. Furthermore, in the road-related data, information items on a travel state (a vehicle speed, a yaw rate, a longitudinal acceleration, or a lateral acceleration) of the vehicle may be included. In the road-related data, information items on a driving operation of the driver (the presence or absence of grasping of the steering wheel, the presence or absence of driver's accelerator operation or brake operation, a steering angle, a steering torque, an amount of accelerator operation, and an amount of brake operation) may be included. In the information of the driving operation, information on the presence or absence of the rapid operation by the driver may be included. The rapid operation means a driving operation in which the steering angle, the steering torque, the amount of accelerator operation, or the amount of brake operation increases equal to or more than a threshold value within a predetermined time period. In addition to the steering angle and the steering torque, a steering angular velocity may be used. In the road-related data, information on a sensor state of the external sensor 2 may be included. The sensor state means, for example, information on a sensor setting position, posture angle information, or the sensor abnormality information. In the sensor abnormality information, for example, information items on the presence or absence of surface deposits, fogging state of the camera, and backlight state of the camera and the like are included.

The road-related data acquisition unit 11 acquires the road-related data in association with a position of the vehicle on the map recognized by the vehicle position recognition unit 12. That is, the road-related data is acquired for each position of the vehicle on the map. The road-related data acquisition unit 11 may associate the direction of the vehicle with the road-related data in addition to the position of the vehicle. The direction of the vehicle can be acquired from a temporal change of the position of the vehicle or the yaw rate of the vehicle using a known method. In a case where a link ID for each road is included in the map information, the road-related data acquisition unit 11 may associate the link ID for each road on which the vehicle travels with the road-related data. The road-related data acquisition unit 11 may associate an acquisition time at which the road-related data is acquired with the road-related data. The road-related data acquisition unit 11 may associate weather information with the road-related data. The weather information can be acquired from an outside through the communication. The weather information may be configured to include detection information from a rain drop sensor or illuminance information from an illuminance sensor provided on the vehicle.

The vehicle position recognition unit 12 recognizes the position of the vehicle on the map based on the position information from the GPS receiver 1 and the map information from the map database 4. The vehicle position recognition unit 12 may recognize the position of the vehicle by the Simultaneous Localization and Mapping (SLAM) using the position information of fixed obstacles such as the electric poles included in the map information from the map database 4 and a result of detection by the external sensor 2.

The system stability calculation unit 13 calculates a stability of the route planning system 100. The stability of the route planning system 100 is an index for determining whether the route plan generated by the route planning system 100 can be trusted or not. In a case where the stability is equal to or lower than a threshold value, the route planning ECU 10 determines that the route plan cannot be trusted. In a case where the route planning system 100 configures a part of the autonomous driving system, when it is determined that the route plan cannot be trusted, the autonomous driving system stops the autonomous driving of a vehicle along the route plan.

In a case where the lane line information of the road cannot be acquired from the result of detection by the external sensor 2, since the system stability calculation unit 13 cannot generate the route plan more accurate than that in a case where the lane line information of the road can be acquired, the stability can be calculated as a low value. In a case where the lane line on the road is hidden by another vehicle or structures (the electric poles, the walls, or the buildings) around the vehicle, the system stability calculation unit 13 may calculate the stability using a ratio of the hidden lane lines. The ratio of the hidden lane lines can be obtained using a known image processing technology. The system stability calculation unit 13 may calculate the stability using a known method. In a case where the stability of the route planning system 100 is calculated, the system stability calculation unit 13 stores the stability of the route planning system 100 in association with the position of the vehicle on the map recognized by the vehicle position recognition unit 12.

The collection target position setting unit 14 sets a collection target position that is a road-related data collection target by the vehicle. The collection target position setting unit 14 sets the collection target position based on the road-related data situation for each position stored in the road-related data situation storage unit 5. In the road-related data situation, at least one of a collection degree of the road-related data and a freshness of the road-related data are included.

The collection degree of the road-related data is a degree of accumulation of the road-related data for each position on the map in the server 102. The collection degree of the road-related data becomes a large value when the road-related data of the same position is transmitted to the server 102 a plurality of times by the same or a plurality of vehicles and accumulated in the server 102. The server 102 may be configured such that the road-related data which has been stored for longer than a predetermined period from the accumulation is deleted. The collection degree becomes a small value by deleting the road-related data.

The freshness of the road-related data is a degree of elapsed time of the road-related data in the server 102 for each position on the map. The freshness of the road-related data has a higher value as the elapsed time from the acquisition of the road-related data becomes shorter. In other words, the freshness of the road-related data has a lower value as the longer time elapses from the acquisition of the road-related data.

The collection target position is a position where the collection degree of the road-related data is lower than a first threshold value or a position where the freshness of the road-related data is lower than a second threshold value. The first threshold value and the second threshold value are values set in advance.

Specifically, the collection target position setting unit 14 detects a plurality of routes to a destination from the current position of the vehicle on the map based on the position of the vehicle on the map and the destination set in advance, and recognizes the road-related data situation that is associated with the position on each route. The destination set in advance may be a destination set by the driver or occupants or may be a destination automatically set by the route planning system 100 using a known method. The route detection may be performed using a known method. The route detection may be performed by a not illustrated navigation system. In a case where the route has multiple lanes, the collection target position setting unit 14 may set the collection target position for each lane.

The collection target position setting unit 14 sets the collection target position on each route based on the road-related data situation that is associated with the position on each route. The destination setting is optional. The collection target position setting unit 14 may recognize the road-related data situation that is associated with the position on the travelling road on which the vehicle travels and may set the collection target position on the travelling road.

The route plan generation unit 15 generates a route plan for the vehicle based on the position of the vehicle on the map recognized by the vehicle position recognition unit 12, the destination set in advance, and the collection target position set by the collection target position setting unit 14. The route plan is a plan relating to a route for the vehicle for travelling in order to reach the destination. In the route plan, the route for the vehicle is determined in a lane by lane basis.

The route plan generation unit 15 generates, for example, the route plan for the vehicle such that the vehicle travels on the route including the most collection target positions among routes from the current position of the vehicle on the map to the destination and the routes that satisfy a driver's desired condition set in advance. The driver's desired condition set in advance is a condition such as an allowable time for reaching the destination (for example, a required time allowable to the driver according to a distance), a fuel economy priority, a use or no-use of the toll road. The route plan generation unit 15 does not necessarily need to select the route including the most collection target positions, but may generate the route plan such that the vehicle travels on the route having the earliest arrival time among the routes that include the collection target positions equal to or greater than a predetermined threshold value.

The route plan generation unit 15 determines whether or not the collection target position is present in an adjacent lane adjacent to a travelling lane in which the vehicle travels, based on the position of the vehicle on the map, the collection target position set by the collection target position setting unit 14. In a case where it is determined that the collection target position is present in the adjacent lane, the route plan generation unit 15 determines whether or not the position in the travelling lane aligned to the collection target position in the adjacent lane is the collection target position. In a case where it is determined that the position in the travelling lane aligned to the collection target position in the adjacent lane is not the collection target position, the route plan generation unit 15 generates the route plan including a lane change such that the vehicle travels through the collection target position in the adjacent lane.

The route plan generation unit 15 generates the route plan while considering the traffic regulation as well. For example, even in a case where the collection target position is present in the adjacent lane, if the adjacent lane is an overtaking lane, since it is legally inappropriate to travel except for overtaking, the route plan generation unit 15 does not generate the route plan including the lane change to the adjacent lane. In addition, in a case where the stability of the route planning system 100 can be predicted by a known method, the route plan generation unit 15 may generate the route plan based on the result of prediction of the stability. In this case, the route plan generation unit 15 generates the route plan such that the stability is predicted to be equal to or higher than a predetermined threshold value and the vehicle travels on the route on which the collection target position is present. In addition, in a case where the destination is not set, the route plan generation unit 15 may generate the route plan on the travelling road on which the vehicle travels.

The priority setting unit 16 determines whether or not a plurality of collection target positions are present on the route in the route plan generated by the route plan generation unit 15. In a case where it is determined that the plurality of collection target positions are present on the route, the priority setting unit 16 sets a priority to the plurality of collection target positions on the route. In a case where the plurality of collection target positions are present on the route, if the road-related data items of many collection target positions are transmitted to the server 102 at once, a communication amount is influenced by a communication amount limit per unit time on a network or the like, and thus, there is a possibility that the road related data items cannot be appropriately transmitted. Therefore, the priority setting unit 16 sets the priority on the road-related data items on the collection target positions.

In a case where it is determined that the plurality of collection target positions are present on the route, the priority setting unit 16 may set the priority in order in which the vehicle passes though the collection target positions. Alternatively, the priority setting unit 16 may set the priority in ascending order of the collection degree of the road-related data at the collection target positions. The priority setting unit 16 may set the priority in ascending order of the freshness of the road-related data. A below described transmission necessity determination of the road-related data is performed in the order of the priority. In a case of being determined to be transmitted, the road-related data is transmitted to the server 102 in the order of the priority.

Configuration of the Transmission Necessity Determination Apparatus

Hereinafter, the transmission necessity determination apparatus 101 will be described. The transmission necessity determination apparatus 101 determines whether or not to transmit the road-related data acquired by the road-related data acquisition unit 11 to the server 102.

As illustrated in FIG. 1, the transmission necessity determination apparatus 101 configures a part of the route planning system 100. The transmission necessity determination apparatus 101 may be configured as a separate apparatus from the route planning system 100.

The transmission necessity determination apparatus 101 includes a transmission necessity determination ECU 20. The transmission necessity determination ECU 20 is an electronic control unit having a CPU, ROM, RAM, CAN communication circuit, and the like. The transmission necessity determination ECU 20 is connected to the route planning ECU 10 in the route planning system 100, the road-related data situation storage unit 5, and the communication unit 6.

Next, a functional configuration of the transmission necessity determination ECU 20 will be described. The transmission necessity determination ECU 20 includes a data situation acquisition unit 21, a stability acquisition unit 22, and a transmission necessity determination unit 23.

In a case where the road-related data acquisition unit 11 in the route planning ECU 10 acquires the road-related data, the data situation acquisition unit 21 acquires the road-related data situation. The data situation acquisition unit 21 acquires the road-related data situation from the road-related data situation storage unit 5 for each position. The data situation acquisition unit 21 may acquire the road-related data situation recognized by the collection target position setting unit 14 in the route planning ECU 10. The data situation acquisition unit 21 may directly acquire the road-related data situation by the communication with the server 102 for each position. The data situation acquisition unit 21 does not necessarily need to acquire both the collection degree of the road-related data and the freshness of the road-related data as the road-related data situation. The data situation acquisition unit 21 may acquire at least one of the collection degree of the road-related data and the freshness of the road-related data.

The stability acquisition unit 22 acquires the stability of the route planning system 100 calculated by the system stability calculation unit 13 in the route planning ECU 10. The stability acquisition unit 22 acquires the stability that is associated with the position of the road-related data acquired by the data situation acquisition unit 21 from the route planning ECU 10.

The transmission necessity determination unit 23 determines whether or not to transmit the road-related data to the server 102 based on the road-related data situation for each position acquired by the data situation acquisition unit 21 and the stability of the route planning system 100 for each position acquired by the stability acquisition unit 22. In a case where the priority of the road-related data items is set by the priority setting unit 16, the transmission necessity determination unit 23 performs the determination of the transmission necessity in the order of the priority.

The transmission necessity determination unit 23 determines not to transmit the road-related data at the position where the collection degree is equal to or higher than a collection degree threshold value or the freshness is equal to or higher than a freshness threshold value to the server 102 from the vehicle. The collection degree threshold value and the freshness threshold value are values set in advance.

In addition, the transmission necessity determination unit 23 determines not to transmit the road-related data at the position where the stability of the route planning system 100 is lower than a stability threshold value to the server 102 from the vehicle. The stability threshold value is a value set in advance. The transmission necessity determination unit 23 determines not to transmit the road-related data at the position where the stability is lower than the stability threshold value to the server 102 from the vehicle regardless of the collection degree and the freshness. The transmission necessity determination unit 23 discards the road-related data which is determined not to be transmitted. The transmission necessity determination unit 23 does not necessarily need to discard the road-related data which is determined not to be transmitted.

The transmission necessity determination unit 23 determines to transmit, for example, the road-related data at the position where the collection degree is lower than the collection degree threshold value and the freshness is lower than the freshness threshold value and simultaneously the road-related data at the position where the stability is equal to or higher than the stability threshold value, to the server 102 from the vehicle.

The transmission necessity determination unit 23 transmits the road-related data determined to be transmitted, to the server 102 via the communication unit 6. The transmission necessity determination unit 23 transmits the road-related data to the server 102 in the order of the transmission determination. That is, the transmission necessity determination unit 23 transmits the road-related data determined to be transmitted, to the server 102 according to the priority set by the priority setting unit 16. The transmission necessity determination unit 23 controls the transmission of the road-related data such that an amount of transmission of the road-related data does not exceed the communication amount limit while considering the communication amount limit per unit time on a network or the like. The transmission necessity determination unit 23 performs the data transmission according to the priority such that the amount of transmission of the road-related data per unit distance of vehicle travelling does not exceed the communication amount limit. The amount of transmission of the road-related data per unit distance may be an amount of transmission per unit distance using the vehicle speed.

Route Plan Generation Processing by the Route Planning System

Figure 2:
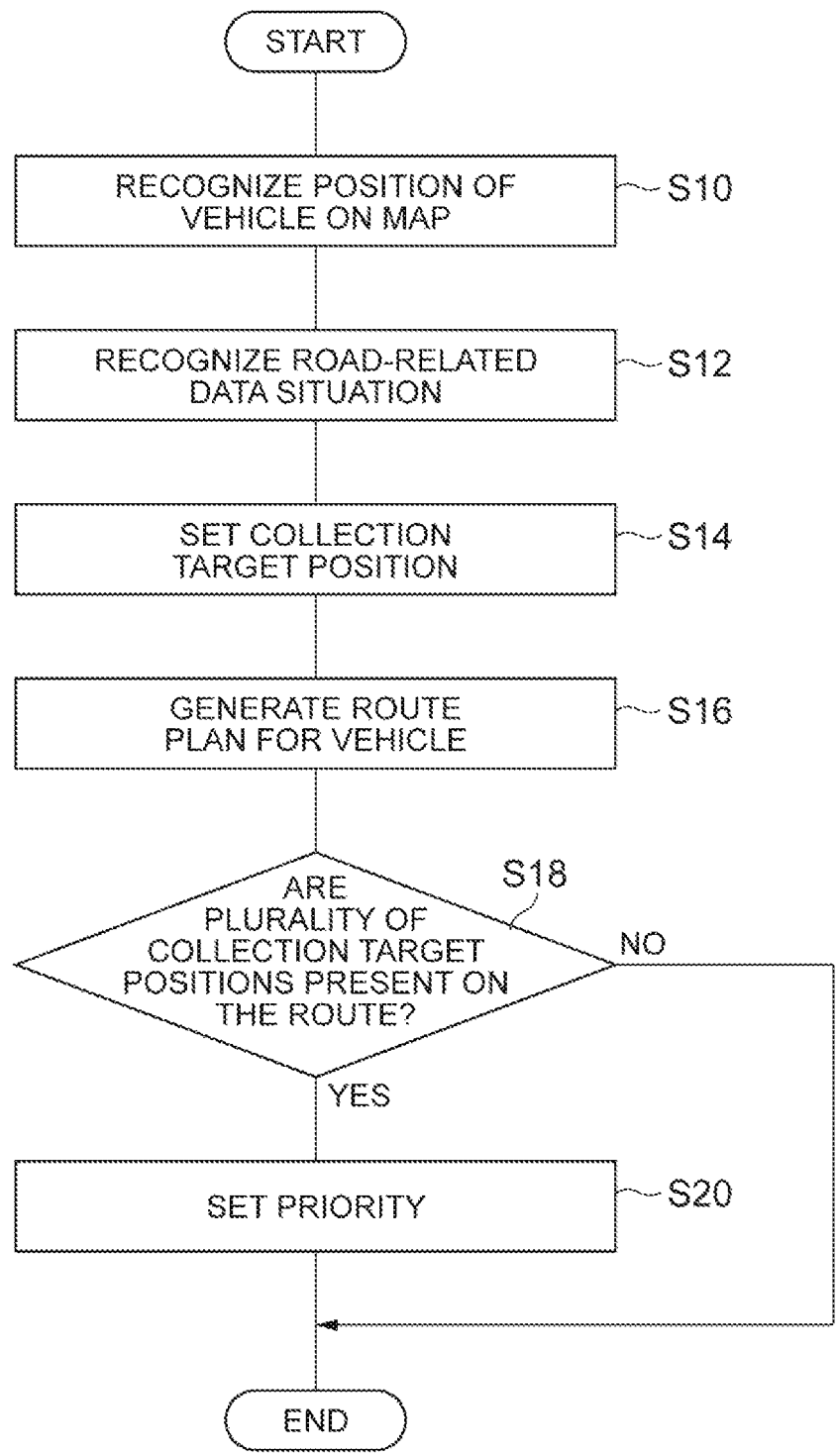
FIG. 2 is a flowchart illustrating route plan generation processing.

Hereinafter, the route plan generation processing by the route planning system 100 in the present embodiment will be described. FIG. 2 is a flowchart illustrating the route plan generation processing. The flowchart in FIG. 2 is executed in a case where the vehicle is in the autonomous driving.

As illustrated in FIG. 2, the route planning ECU 10 in the route planning system 100 causes the vehicle position recognition unit 12 to perform the recognition of the position of the vehicle on the map as S10. The vehicle position recognition unit 12 recognizes the position of the vehicle on the map based on the position information from the GPS receiver 1 and the map information from the map database 4.

In S12, the route planning ECU 10 causes the collection target position setting unit 14 to perform the acquisition of the road-related data situation. The collection target position setting unit 14 detects a plurality of routes from the current position of the vehicle on the map to the destination based on the position of the vehicle on the map and the destination set in advance, and recognizes the road-related data situation that is associated with the position on each route. The collection target position setting unit 14 recognizes the road-related data situation for each position by requesting the road-related data situation storage unit 5 for the road-related data situation that is associated with the position on the route.

In S14, the route planning ECU 10 causes the collection target position setting unit 14 to perform a setting of the collection target position. The collection target position setting unit 14 sets the position where the collection degree of the road-related data is lower than the first threshold value or the position where the freshness of the road-related data is lower than the second threshold value as the collection target position based on the road-related data situation for each position.

In S16, the route planning ECU 10 causes the route plan generation unit 15 to perform the generation of the route plan for the vehicle. The route plan generation unit 15 generates the route plan for the vehicle based on the position of the vehicle on the map, the destination set in advance, and the collection target position. For example, the route plan generation unit 15 generates the route plan for the vehicle such that the vehicle travels on the route including the most collection target positions among the routes from the current position of the vehicle on the map to the destination and the routes that satisfy a driver's desired condition set in advance.

In S18, the route planning ECU 10 causes the priority setting unit 16 to determine whether or not a plurality of collection target positions are present on the route in the route plan. In a case where it is determined that the plurality of collection target positions are not present on the route (No in S18), the route planning ECU 10 ends current processing. In a case where the route plan generation condition set in advance (for example, a case where the vehicle travels a predetermined distance) is satisfied, the route planning ECU 10 repeats the processing items from S10 again. On the other hand, in a case where it is determined that the plurality of collection target positions are present on the route (Yes in S18), the route planning ECU 10 causes the processing to proceed to S20.

In S20, the route planning ECU 10 causes the priority setting unit 16 to perform the setting of the priority of the collection target position. For example, the priority setting unit 16 sets the priority in the order in which the vehicle passes though the collection target positions. Then, the route planning ECU 10 ends the current processing. In a case where the route plan generation condition set in advance is satisfied, the route planning ECU 10 repeats the processing from S10 again.

Internal Processing of the Route Plan Generation Processing

Figure 3:
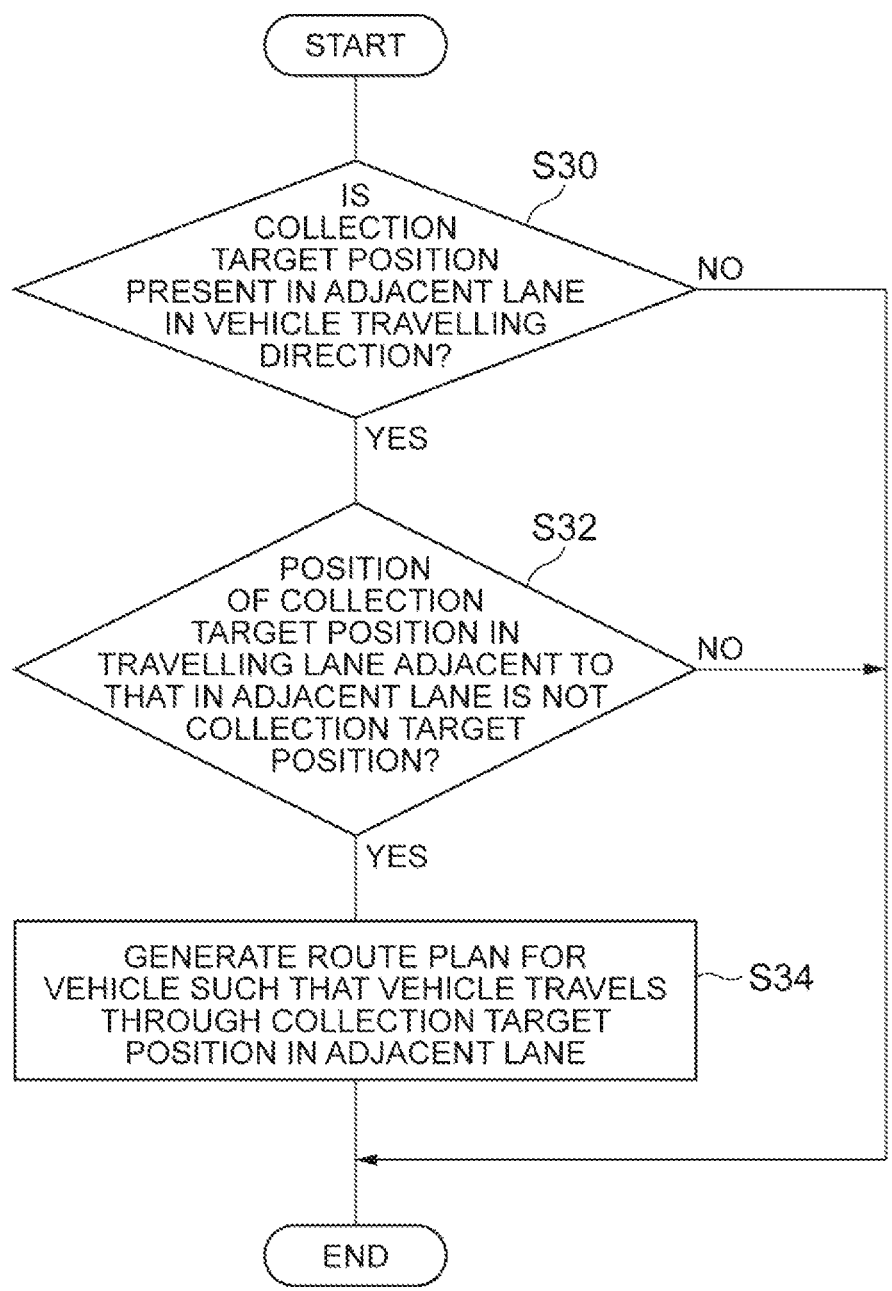
FIG. 3 is a flowchart illustrating an example of internal processing of the route plan generation.

Subsequently, an example of the internal processing of the route plan generation processing (S16) illustrated in FIG. 2 will be described. FIG. 3 is a flowchart illustrating the example of internal processing of the route plan generation. In the flowchart illustrated in FIG. 3, as a premise, in S14 in FIG. 2, the collection target position is set not only in the travelling lane on the travelling road on which the vehicle travels but also in the adjacent lane adjacent to the travelling lane.

As illustrated in FIG. 3, as S30, the route planning ECU 10 causes the route plan generation unit 15 to determine whether or not the collection target position is present in the vehicle travelling direction in the adjacent lane of the vehicle travelling lane on which the vehicle travels. The route plan generation unit 15 determines whether or not the collection target position is present in the vehicle travelling direction in the adjacent lane based on the position of the vehicle on the map, the map information, and the collection target position set by the collection target position setting unit 14. The vehicle travelling direction corresponds to an extending direction of the travelling lane in front of the vehicle.

In a case where it is determined that the collection target position is not present in the adjacent lane in the vehicle travelling direction, (No in S30), the route planning ECU 10 ends the processing in the flowchart illustrated in FIG. 3. The case where it is determined that the collection target position is not present in the adjacent lane in the vehicle travelling direction includes a case where the lane in which the vehicle travels is a single lane and there is no adjacent lane. On the other hand, in a case where it is determined that the collection target position is present in the adjacent lane in the vehicle travelling direction, (Yes in S30), the route planning ECU 10 causes the processing to proceed to S32.

In S32, the route planning ECU 10 causes the route plan generation unit 15 to determine whether or not the position in the travelling lane adjacent to the collection target position in the adjacent lane is the collection target position. In a case where it is determined that the position in the travelling lane adjacent to the collection target position in the adjacent lane is the collection target position (No in S32), the route planning ECU 10 ends the processing in the flowchart illustrated in FIG. 3. In a case where it is determined that the position in the travelling lane adjacent to the collection target position in the adjacent lane is not the collection target position (Yes in S32), the route planning ECU 10 causes the processing to proceed to S34.

In S34, the route planning ECU 10 causes the route plan generation unit 15 to generate the route plan including the lane change of the vehicle such that the vehicle travels through collection target position in the adjacent lane. Then, the current processing ends.

Figure 4:
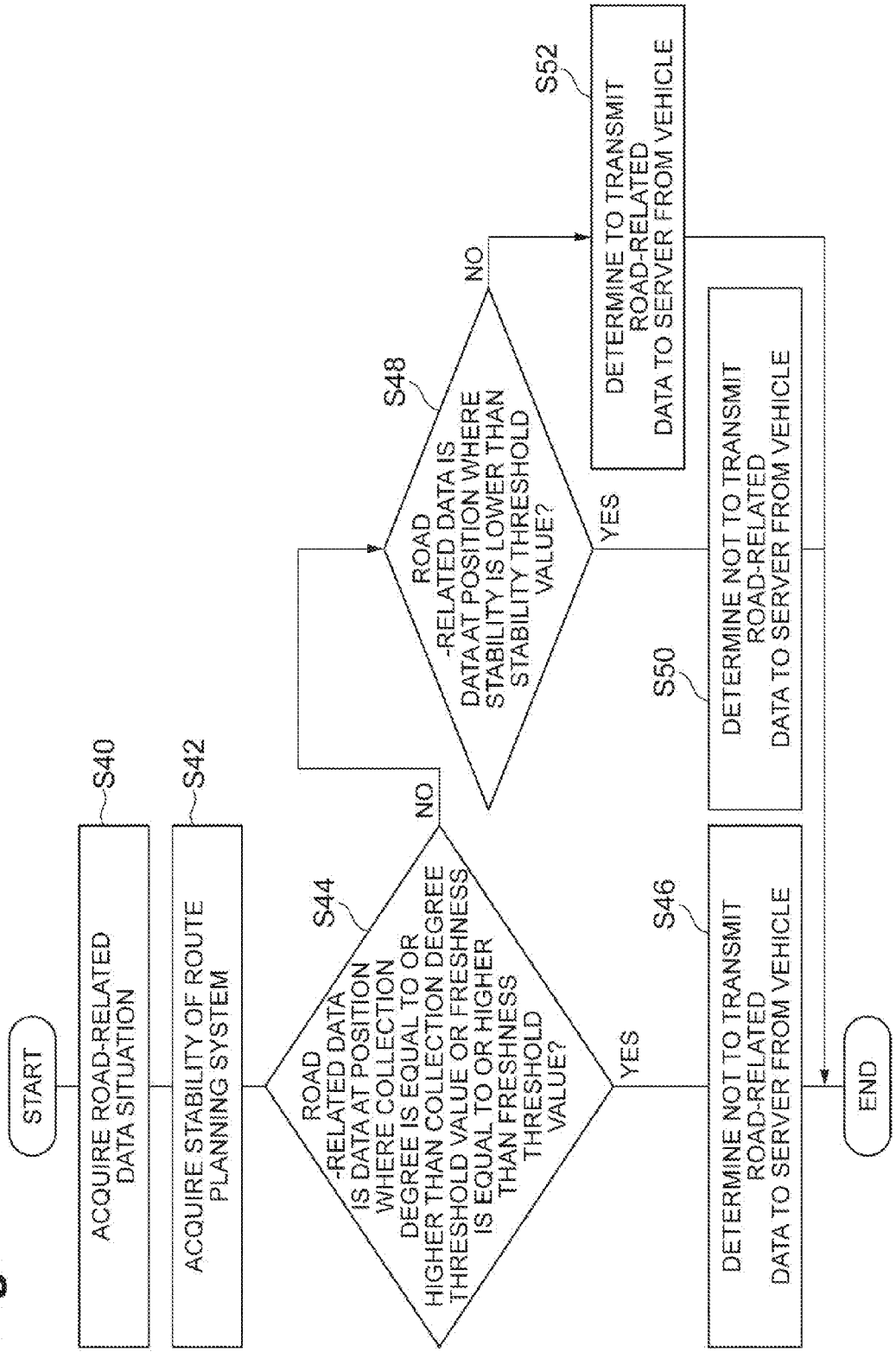
FIG. 4 is a flowchart illustrating transmission necessity determination processing.

Transmission Necessity Determination Processing by the Transmission Necessity Determination Apparatus Next, the transmission necessity determination processing by the transmission necessity determination apparatus 101 in the present embodiment will be described. FIG. 4 is a flowchart illustrating the transmission necessity determination processing. The flowchart in FIG. 4 is executed in a case where the vehicle acquires the road-related data. In the flowchart in FIG. 4, the transmission necessity determination processing is performed with regard to the road-related data of one position. The transmission necessity determination apparatus 101 performs the transmission necessity determination processing in the order of the priority in a case where the priority is set. The transmission necessity determination apparatus 101 may perform the transmission necessity determination processing immediately after the vehicle acquires the road-related data or may collectively perform the transmission necessity determination processing with regard to the road-related data items for several hours or several days.

As illustrated in FIG. 4, the transmission necessity determination ECU 20 in the transmission necessity determination apparatus 101 causes the data situation acquisition unit 21 to perform the acquisition of the road-related data situation as S40. The data situation acquisition unit 21 acquires the road-related data situation at the position corresponding to the road-related data acquired by the road-related data acquisition unit 11 in the route planning ECU 10 from the road-related data situation storage unit 5.

In S42, the transmission necessity determination ECU 20 causes the stability acquisition unit 22 to acquire the stability of the route planning system 100. The stability acquisition unit 22 acquires the stability that is associated with the position of the road-related data acquired by the data situation acquisition unit 21 from the route planning ECU 10.

In S44, the transmission necessity determination ECU 20 causes the transmission necessity determination unit 23 to determine whether or not the road-related data is the data at the position where the collection degree is equal to or higher than the collection degree threshold value or the freshness is equal to or higher than the freshness threshold value. The transmission necessity determination unit 23 performs the determination in S44 based on the road-related data situation acquired by the data situation acquisition unit 21.

In a case where the road-related data is the data at the position where the collection degree is equal to or higher than the collection degree threshold value or the freshness is equal to or higher than the freshness threshold value (Yes in S44), the transmission necessity determination ECU 20 causes the processing to proceed to S46. In a case where the road-related data is not the data at the position where the collection degree is equal to or higher than the collection degree threshold value or the freshness is equal to or higher than the freshness threshold value (No in S44), the transmission necessity determination ECU 20 causes the processing to proceed to S48.

In S46, the transmission necessity determination ECU 20 causes the transmission necessity determination unit 23 to determine not to transmit the current road-related data to the server 102 from the vehicle.

In S48, the transmission necessity determination ECU 20 causes the transmission necessity determination unit 23 to determine whether or not the road-related data is the data at the position where the stability is lower than the stability threshold value. The transmission necessity determination ECU 20 performs the determination in S48 based on the stability of the route planning system 100 acquired by the stability acquisition unit 22.

In a case where the road-related data is the data at the position where the stability is lower than the stability threshold value (Yes in S48), the transmission necessity determination ECU 20 causes the processing to proceed to S50. In a case where the road-related data is not the data at the position where the stability is lower than the stability threshold value (No in S48), the transmission necessity determination ECU 20 causes the processing to proceed to S52.

In S50, the transmission necessity determination ECU 20 causes the transmission necessity determination unit 23 to determine not to transmit the current road-related data to the server 102 from the vehicle.

In S52, the transmission necessity determination ECU 20 causes the transmission necessity determination unit 23 to determine to transmit the current road-related data to the server 102 from the vehicle. The transmission necessity determination ECU 20 transmits the current road-related data to the server 102 via the communication unit 6. The road-related data is transmitted to the server 102 in a state of being associated with the position on the map.

After the transmission necessity determinations in S46, S50, and S52, in a case where the road-related data which becomes the next determination target is present, the transmission necessity determination ECU 20 performs the transmission necessity determination processing with regard to the next road-related data. In a case where the road-related data which becomes the next determination target is not present, the transmission necessity determination ECU 20 ends the transmission necessity determination processing.

Operational Effects of the Transmission Necessity Determination Apparatus

According to the transmission necessity determination apparatus 101 in the present embodiment, the road-related data at the position where the collection degree is equal to or higher than the collection degree threshold value or the freshness is equal to or higher than the freshness threshold value is determined not to be transmitted to the server from the vehicle. In addition, according to the transmission necessity determination apparatus 101, even in a case where the collection degree is lower than the collection degree threshold value or the freshness is lower than the freshness threshold value, the road-related data at the position where the stability of the vehicle-mounted system is lower than the stability threshold value is determined not to be transmitted to the server from the vehicle. Therefore, it is possible to prevent the road-related data having the low stability of the vehicle-mounted system and the low reliability from being transmitted to the server from the vehicle. Therefore, according to the transmission necessity determination apparatus 101, it is possible to suppress the transmission of the unnecessary road-related data to the server from the vehicle.

Operational Effects of the Route Planning System

According to the route planning system 100 in the present embodiment, since the transmission necessity determination apparatus 101 is included, it is possible to suppress the transmission of the unnecessary road-related data to the server from the vehicle. According to the route planning system 100, the route plan for the vehicle is generated such that the collection target position is included in the route, which is the position where the collection degree of the road-related data is lower than the first threshold value or the freshness of the road-related data is lower than the second threshold value. Therefore, it is possible to efficiently collect the road-related data necessary for the generation of the map information or the like. Furthermore, according to the route planning system 100, in a case where the collection target position is present in the adjacent lane in the vehicle travelling direction and the position in the travelling lane adjacent to the collection target position in the adjacent lane is not the collection target position, the route plan including the lane change of the vehicle is generated such that the vehicle travels through the collection target position in the adjacent lane. Therefore, it is possible to efficiently collect the road-related data in the lane by lane basis.

As above, embodiments for the present disclosure are described. However, the present disclosure is not limited to the embodiments described above. Including the above-described embodiment, the present disclosure can be embodied in aspects of various modifications and improvements based on the knowledge of those skilled in the art.

The route planning system 100 may configure a part of a driving assistance system, not the autonomous driving system. In this case, the route plan generated by the route planning system 100 is used for a driving assistance control that assists driver's driving. In addition, the vehicle-mounted system that acquires the road-related data in the present disclosure is not limited to the route planning system 100. Any system may be used as the vehicle-mounted system as long as the system acquires the road-related data and can calculate the stability of the system. The stability does not necessarily need to be a stability of overall system, but may be a sensor-related stability used by the system.

The route planning system 100 may set the collection target position based on both the collection degree of the road-related data and the freshness of the road-related data, not based on only one of the collection degree of the road-related data and the freshness of the road-related data. Similarly, the transmission necessity determination apparatus 101 may determine whether or not to transmit the road-related data to the server 102 based on both the collection degree of the road-related data and the freshness of the road-related data.

The collection target position setting unit 14 in the route planning system 100 does not necessarily need to perform the setting of the collection target position on the route detected using the destination. The collection target position setting unit 14 may set the collection target position on the travelling road on which the vehicle travels based on the position of the vehicle on the map recognized by the vehicle position recognition unit 12 without performing the route detection. The collection target position setting unit 14 may set the collection target position on all the roads within a certain distance from the position of the vehicle. In addition, the collection target position setting unit 14 does not necessarily need to set the collection target position while distinguishing each lane.

The collection target position setting unit 14 may set the collection target position with a section as a unit, in which the consecutive positions are consolidated. That is, the collection target position setting unit 14 may be a collection target section setting unit that sets the collection target section. Here, the section is set on the map in advance. The section is a range in which, for example, the route on the map is divided by the intersections or branch points (so-called nodes). In a case where the nodes are separated by equal to or greater than a predetermined distance, the section may be separately set for each predetermined distance (for example, 100 m). The section may be separately set for each of a certain distance regardless of the nodes. In a case where the map information is divided by an area unit set in advance, the section may be separately set according to the area.

The collection degree of the road-related data in a section is, for example, a minimum value of the collection degree of the road-related datas for each position included in the section. The collection degree of the road-related data in a section may be an average value of the collection degree of the road-related datas for each position included in the section. Similarly, the freshness of the road-related data in the section is, for example, a minimum value of the freshnesses of the road-related data for each position included in the section. The freshness of the road-related data in the section may be an average value of the freshnesses of the road-related data items for each position included in the section.

The transmission necessity determination unit 23 may determine whether or not to transmit the road-related data to the server 102 from the vehicle for each section described above. In this case, the collection target position setting unit 14 does not necessarily set the collection target section with the section as the unit.

In the present embodiment, the route planning ECU 10 and the transmission necessity determination ECU 20 are separated from each other. However, the ECU 10 and the ECU 20 may be configured to be one ECU. A part of the functions (for example, generation of the route plan) of the route planning system 100 may be performed by an external computer such as the server 102. Even in this case, the route planning system 100 is the vehicle-mounted system.

The route planning system 100 does not necessarily need to set the priority. That is, the route planning system 100 does not necessarily need to include the priority setting unit 16. In this case, the transmission necessity determination apparatus 101 may determine whether or not to transmit the road-related data to the server 102 in order of acquiring the road-related data by the route planning system 100.

What is claimed is:

1. A transmission necessity determination apparatus configured to determine whether or not to transmit road-related data acquired by a vehicle-mounted system to a server from a vehicle, the apparatus comprising:
    a data situation acquisition unit configured to acquire at least one of a collection degree of the road-related data for each position on a map and a freshness of the road-related data for each position;
    a stability acquisition unit configured to acquire a stability of the vehicle-mounted system for each position from the vehicle-mounted system; and
    a transmission necessity determination unit configured to determine whether or not to transmit the road-related data to the server from the vehicle based on at least one of the collection degree of the road-related data for each position on the map and the freshness of the road-related data for each position and the stability of the vehicle-mounted system for each position,
    wherein the transmission necessity determination unit is configured
    to determine not to transmit the road-related data where the collection degree is equal to or higher than a collection degree threshold value or the road-related data where the freshness is equal to or higher than a freshness threshold value to the server from the vehicle, and
    to determine not to transmit the road-related data where the stability of the vehicle-mounted system is lower than a stability threshold value to the server from the vehicle.

2. A route planning system configured to include the transmission necessity determination apparatus according to claim 1 and configured to be mounted on a vehicle, the system comprising:
    a road-related data acquisition unit configured to acquire road-related data of a travelling road on which the vehicle travels;
    a vehicle position recognition unit configured to recognize a position of the vehicle on a map; and
    a route plan generation unit configured to generate a route plan for the vehicle based on: at least one of either a collection degree of the road-related data for each position on the map acquired by the transmission necessity determination apparatus and a freshness of the road-related data for each position acquired by the transmission necessity determination apparatus; the position of the vehicle on the map; and map information,
    wherein the route plan generation unit is configured to generate the route plan such that a collection target position is included in a route for the vehicle, which is a position where the collection degree of the road-related data is lower than a first threshold value or a position where the freshness of the road-related data is lower than a second threshold value.

3. The route planning system according to claim 2,
    wherein the route plan generation unit is configured to generate a route plan including a lane change of the vehicle such that the vehicle travels through the collection target position in an adjacent lane in a case where the collection target position is present in a vehicle travelling direction in the adjacent lane adjacent to a travelling lane in which the vehicle travels and the position in the travelling lane adjacent to the collection target position in the adjacent lane is not the collection target position.

* * * * *